(12) United States Patent
Suzuki et al.

(10) Patent No.: US 12,651,811 B2
(45) Date of Patent: Jun. 9, 2026

(54) TERMINAL COMPONENT, SECONDARY BATTERY, AND METHOD FOR MANUFACTURING TERMINAL COMPONENT

(71) Applicant: PRIME PLANET ENERGY & SOLUTIONS, INC., Tokyo (JP)

(72) Inventors: Kosuke Suzuki, Toyota (JP); Takahiro Sakurai, Nagoya (JP); Koshiro Yoneda, Ichinomiya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 807 days.

(21) Appl. No.: 17/570,159

(22) Filed: Jan. 6, 2022

(65) Prior Publication Data

US 2022/0231386 A1 Jul. 21, 2022

(30) Foreign Application Priority Data

Jan. 21, 2021 (JP) ................................. 2021-008263

(51) Int. Cl.
| | |
|---|---|
| *H01M 50/552* | (2021.01) |
| *B21D 22/02* | (2006.01) |
| *H01M 10/0525* | (2010.01) |
| *H01M 50/562* | (2021.01) |
| *H01M 50/564* | (2021.01) |

(52) U.S. Cl.
CPC .......... *H01M 50/552* (2021.01); *B21D 22/02* (2013.01); *H01M 10/0525* (2013.01); *H01M 50/562* (2021.01); *H01M 50/564* (2021.01); *H01M 2220/20* (2013.01)

(58) Field of Classification Search
CPC ............. H01M 50/552; H01M 50/525; H01M 50/562; H01M 50/564; H01M 2220/20; B21D 22/02
See application file for complete search history.

(56) References Cited

U.S. PATENT DOCUMENTS

| | | | |
|---|---|---|---|
| 2008/0003876 A1 | 1/2008 | Fukaya et al. | |
| 2013/0180757 A1 | 7/2013 | Uno et al. | |
| 2014/0212741 A1* | 7/2014 | Kim .................... | H01M 50/528 |
| | | | 429/179 |
| 2019/0044107 A1 | 2/2019 | Ito | |

(Continued)

FOREIGN PATENT DOCUMENTS

| | | |
|---|---|---|
| CN | 101123334 A | 2/2008 |
| CN | 101660559 A | 3/2010 |
| CN | 108698109 A | 10/2018 |

(Continued)

OTHER PUBLICATIONS

Machine translation of JP 2013073745A (Year: 2024).*

(Continued)

*Primary Examiner* — Tong Guo
*Assistant Examiner* — Albert Michael Hilton
(74) *Attorney, Agent, or Firm* — Finnegan, Henderson, Farabow, Garrett, and Dunner, LLP

(57) ABSTRACT

A terminal component includes a first metal and a second metal overlapped on the first metal. At least three biting portions in which an edge of one of the first metal and the second metal bites into the other metal is provided at an interface where the first metal and the second metal are overlapped.

4 Claims, 5 Drawing Sheets

(56)  References Cited

U.S. PATENT DOCUMENTS

| | | |
|---|---|---|
| 2020/0108527 A1 | 4/2020 | Yamamoto et al. |
| 2020/0280028 A1* | 9/2020 | Ehara ................ H01M 10/0525 |

FOREIGN PATENT DOCUMENTS

| | | | |
|---|---|---|---|
| CN | 108701804 A | 10/2018 | |
| JP | 61-211927 A | 9/1986 | |
| JP | H 11-285775 A | 10/1999 | |
| JP | 2000-138055 A | 5/2000 | |
| JP | 2006-012589 A | 1/2006 | |
| JP | 2012-124008 A | 6/2012 | |
| JP | 2013073745 A * | 4/2013 | ........... H01M 2/305 |
| JP | 2013075297 A * | 4/2013 | |
| JP | 2017-103127 A | 6/2017 | |
| JP | 2018-001209 A | 1/2018 | |
| JP | 2018-176285 A | 11/2018 | |
| JP | 6613346 B | 11/2019 | |
| JP | 2022-104017 A | 7/2022 | |
| TW | 201230903 A | 7/2012 | |
| WO | WO 2013-046873 | 4/2013 | |
| WO | WO 2017/141694 A1 | 8/2017 | |

OTHER PUBLICATIONS

Avallone, Eugene, Theodore Baumeister, and Ali Sadegh. Marks' Standard Handbook for Mechanical Engineers. 10. New York: McGraw-Hill, 2006. (Year: 2006).*
Machine translation of JP-2013075297-A (Year: 2025).*

* cited by examiner

TERMINAL COMPONENT, SECONDARY BATTERY, AND METHOD FOR MANUFACTURING TERMINAL COMPONENT

BACKGROUND OF THE INVENTION

1. Field of the Invention

The present disclosure relates to a terminal component, a secondary battery, and a method for manufacturing a terminal component. The present application claims priority based on Japanese Patent Application No. 2021-008263 filed on Jan. 21, 2021, and the entire contents of the application are incorporated herein by reference.

2. Description of the Related Art

Japanese Patent Application Publication No. 2013-75297 discloses an electrode structure including a metal plate in which a bottomed hole is formed and a metal shaft press-fitted into the bottomed hole. Here, a plastically deformed portion of the metal plate enters a constricted space of the metal shaft. It is considered that this makes it possible to increase the joining force of the metal shaft to the metal plate.

Japanese Patent No. 6613346 discloses a non-penetration joint structure of metal members in which a joining member having a protruding portion and a member to be joined are joined to each other. The member to be joined is wrapped around the back surface of an undercut portion formed in the protruding portion, thereby increasing adhesion between the members. It is considered that this ensures a high strength in the axial direction.

SUMMARY OF THE INVENTION

In an in-vehicle battery, a running vibration of a vehicle is also transmitted to an electrode terminals of the battery through a bus bar. When an electrode terminal in which dissimilar metals are mechanically joined is used, a load caused by the vibration is applied to an interface where the dissimilar metals are joined. According to the findings of the present inventor, where such a load is continuously applied to the joining interface of dissimilar metals for a long period of time, a portion where the load is concentrated may be consumed and durability may be lowered. For example, there is a risk that a gap may be formed at the joining interface between dissimilar metals and the joining strength may be lowered, and that moisture may enter the gap and the resistance between dissimilar metals may be increased.

A terminal component disclosed herein includes a first metal and a second metal overlapped on the first metal. A biting portion where an edge of one of the first metal and the second metal bites into the other metal is provided in at least three locations on an interface where the first metal and the second metal are overlapped.

With such a configuration, a load applied to the joining interface of dissimilar metals can be dispersed, and durability of the terminal component can be improved.

Here, the biting portion provided in the terminal component may be wedge-shaped. In at least one of the biting portions, one of the first metal and the second metal may have a recess in which an edge of an opening projects inward with respect to a bottom portion, and the edge of the opening of the recess may bite into the other metal. In at least one of the biting portions, one of the first metal and the second metal may have a protrusion in which an edge of a top portion projects outward with respect to a proximal end, and the edge of the top portion of the protrusion may bite into the other metal. The first metal may be higher in rigidity than the second metal.

In a secondary battery provided with a battery case and an electrode terminal attached to the battery case, the electrode terminal may include a part configured of the terminal component described above.

A method for manufacturing a terminal component disclosed herein includes a step of preparing a first metal, a step of preparing a second metal, and a step of pressurizing the first metal and the second metal. Here, the first metal is higher in rigidity than the second metal and is provided with at least one of a recess having a part in which an edge of an opening projects inward with respect to a bottom portion, and a protrusion having a part in which an edge of a top portion projects outward with respect to a proximal end. In the pressurizing step, the first metal and the second metal are pressed against each other, and the second metal is plastically deformed with respect to the first metal. As a result, at least three biting portions where an edge of one metal of the first metal and the second metal bites into the other metal are formed at an interface where the first metal and the second metal are overlapped.

DESCRIPTION OF THE PREFERRED EMBODIMENTS

Figure 1:
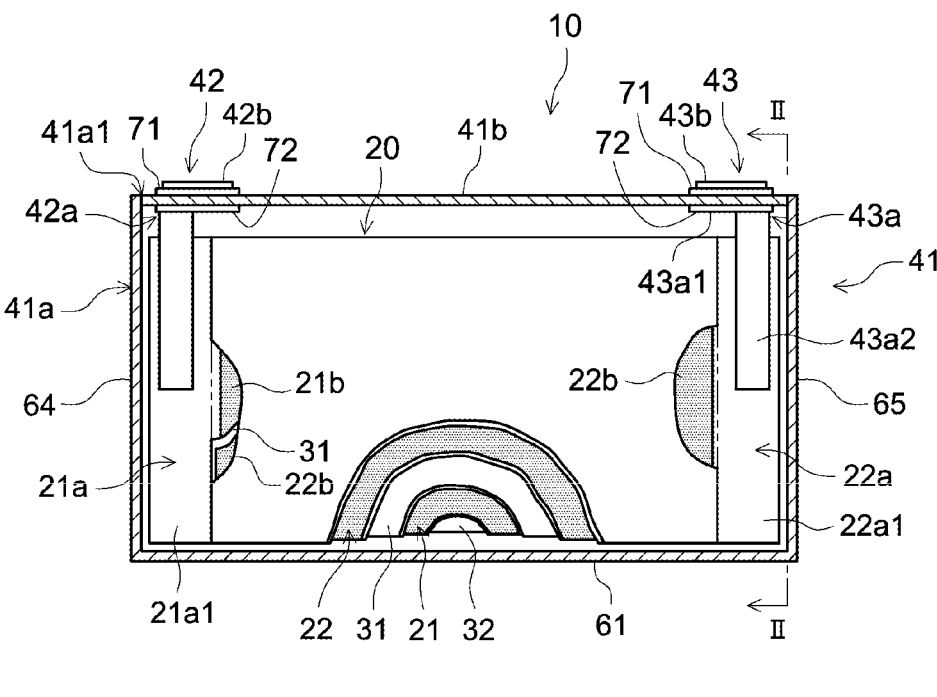
FIG. 1 is a partial cross-sectional view of a lithium ion secondary battery 10.

Hereinafter, an embodiment of the terminal component and secondary battery disclosed herein will be described. The embodiment described herein is, of course, not intended to specifically limit the present disclosure. The present disclosure is not limited to the embodiment described herein, unless otherwise specified. Each drawing is schematically drawn, and the dimensional relationship such as length and width does not necessarily reflect the actual dimensions. In addition, members and parts that perform the same action are designated, as appropriate, by the same reference numerals, and duplicate description thereof will be omitted.

Secondary Battery

In the present description, the "secondary battery" means a device capable of charging and discharging. The secondary battery is inclusive of a battery generally called a lithium ion battery, a lithium secondary battery, or the like, a lithium polymer battery, a lithium ion capacitor, or the like. Here, a lithium ion secondary battery will be illustrated as a form of the secondary battery.

Lithium-Ion Secondary Battery 10

Figure 2:
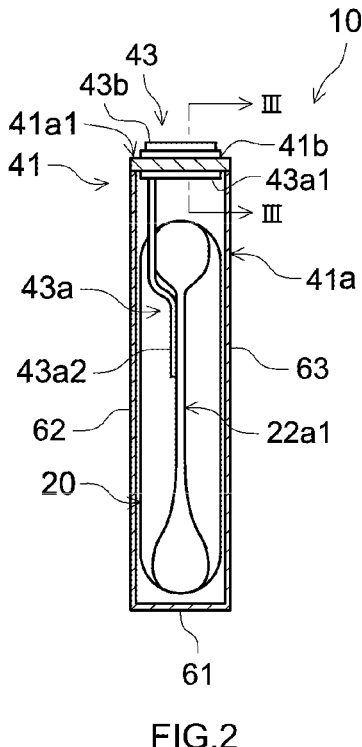
FIG. 2 is a cross-sectional view showing a II-II cross section of FIG. 1.

FIG. 1 is a partial cross-sectional view of a lithium ion secondary battery 10. In FIG. 1, a state in which the inside is exposed is drawn along a wide surface on one side of a substantially rectangular parallelepiped battery case 41. The lithium ion secondary battery 10 shown in FIG. 1 is a so-called sealed battery. FIG. 2 is a cross-sectional view showing a 11-II cross section of FIG. 1. In FIG. 2, a partial cross-sectional view of a substantially rectangular parallelepiped battery case 41 in a state where the inside is exposed along a narrow surface on one side is schematically drawn.

As shown in FIG. 1, the lithium ion secondary battery 10 includes an electrode body 20, a battery case 41, a positive electrode terminal 42, and a negative electrode terminal 43.

Electrode Body 20

The electrode body 20 is accommodated in the battery case 41 in a state of being covered with an insulating film (not shown) or the like. The electrode body 20 includes a positive electrode sheet 21 as a positive electrode element, a negative electrode sheet 22 as a negative electrode element, and separator sheets 31 and 32 as separators. The positive electrode sheet 21, the first separator sheet 31, the negative electrode sheet 22, and the second separator sheet 32 are long strip-shaped members, respectively.

In the positive electrode sheet 21, a positive electrode active material layer 21b including a positive electrode active material is formed on both sides of a positive electrode current collecting foil 21a (for example, an aluminum foil) having a predetermined width and thickness, except for a non-formation portion 21a1 that is set to a constant width at one end in the width direction. For example, in a lithium ion secondary battery, the positive electrode active material is a material capable of releasing lithium ions during charging and absorbing lithium ions during discharging, such as a lithium transition metal composite material. Various positive electrode active materials have been generally proposed in addition to the lithium transition metal composite material, and the type of the positive electrode active material is not particularly limited.

In the negative electrode sheet 22, a negative electrode active material layer 22b including a negative electrode active material is formed on both sides of a negative electrode current collecting foil 22a (here, a copper foil) having a predetermined width and thickness, except for a non-formation portion 22a1 that is set to a constant width at one end in the width direction. For example, in a lithium ion secondary battery, the negative electrode active material is a material capable of occluding lithium ions during charging and releasing the occluded lithium ions during discharging, such as natural graphite. Various negative electrode active materials have been generally proposed in addition to natural graphite, and the type of the negative electrode active material is not particularly limited.

For the separator sheets 31 and 32, for example, a porous resin sheet which has a required heat resistance and through which an electrolyte can pass is used. Various separator sheets have been proposed for the separator sheets 31 and 32, and the type thereof is not particularly limited.

Here, the negative electrode active material layer 22b is formed, for example, to be wider than the positive electrode active material layer 21b. The width of the separator sheets 31 and 32 is larger than that of the negative electrode active material layer 22b. The non-formation portion 21a1 of the positive electrode current collecting foil 21a and the non-formation portion 22a1 of the negative electrode current collecting foil 22a are directed to opposite sides in the width direction. Further, the positive electrode sheet 21, the first separator sheet 31, the negative electrode sheet 22, and the second separator sheet 32 are oriented in the length direction, stacked in this order and wound. The negative electrode active material layer 22b covers the positive electrode active material layer 21b with the separator sheets 31 and 32 interposed therebetween. The negative electrode active material layer 22b is covered with separator sheets 31 and 32. The non-formation portion 21a1 of the positive electrode current collecting foil 21a protrudes from one side of the separator sheets 31 and 32 in the width direction. The non-formation portion 22a1 of the negative electrode current collecting foil 22a protrudes from the separator sheets 31 and 32 on the opposite side in the width direction.

As shown in FIG. 1, the above-described electrode body 20 is flattened along one plane including the winding axis so as to be accommodated in the case body 41a of the battery case 41. The non-formation portion 21a1 of the positive electrode current collecting foil 21a is arranged on one side, and the non-formation portion 22a1 of the negative electrode current collecting foil 22a is arranged on the opposite side along the winding axis of the electrode body 20.

Battery Case 41

As shown in FIG. 1, the electrode body 20 is accommodated in the battery case 41. The battery case 41 has a case body 41a having a substantially rectangular parallelepiped angular shape with one side open, and a lid 41b mounted on the opening. In this embodiment, the case body 41a and the lid 41b are formed of aluminum or an aluminum alloy mainly composed of aluminum, from the viewpoint of weight reduction and ensuring the required rigidity.

Case Body 41a

As shown in FIGS. 1 and 2, the case body 41a has a substantially rectangular parallelepiped angular shape with one side open. The case body 41a has a substantially rectangular bottom surface portion 61, a pair of wide surface portions 62 and 63, and a pair of narrow surface portions 64 and 65. Each of the pair of wide surface portions 62 and 63 rises from the long side of the bottom surface portion 61. Each of the pair of narrow surface portions 64 and 65 rises from the short side of the bottom surface portion 61. An opening 41a1 surrounded by a pair of wide surface portions 62 and 63 and a pair of narrow surface portions 64 and 65 is formed on one side surface of the case body 41a.

Lid 41b

The lid 41b is mounted on the opening 41a1 of the case body 41a surrounded by the long sides of the pair of wide surface portions 62 and 63 and the short sides of the pair of narrow surface portions 64 and 65. The peripheral edge of the lid 41b is joined to the edge of the opening 41a1 of the case body 41a. Such joining may be performed by, for example, continuous welding with no gaps. Such welding can be achieved, for example, by laser welding.

In this embodiment, a positive electrode terminal 42 and a negative electrode terminal 43 are attached to the lid 41b. The positive electrode terminal 42 includes an internal terminal 42a and an external terminal 42b. The negative electrode terminal 43 includes an internal terminal 43a and an external terminal 43b. The internal terminals 42a and 43a are attached to the inside of the lid 41b with an insulator 72 interposed therebetween. The external terminals 42b and 43b are attached to the outside of the lid 41b with a gasket 71 interposed therebetween. The internal terminals 42a and 43a extend inside the case body 41a. The internal terminal 42a of the positive electrode is connected to the non-formation portion 21a1 of the positive electrode current collecting foil 21a. The internal terminal 43a of the negative electrode is connected to the non-formation portion 22a1 of the negative electrode current collecting foil 22a.

As shown in FIG. 1, the non-formation portion 21a1 of the positive electrode current collecting foil 21a of the electrode body 20 and the non-formation portion 22a1 of the negative electrode current collecting foil 22a are attached to the internal terminals 42a and 43a that are attached to both sides of the lid 41b in the longitudinal direction. The electrode body 20 is accommodated in the battery case 41 in a state of being attached to the internal terminals 42a and 43a attached to the lid 41b. Here, the wound electrode body 20 is illustrated by way of example. The structure of the electrode body 20 is not limited to such a form. The structure of the electrode body 20 may be, for example, a laminated structure in which a positive electrode sheet and a negative electrode sheet are alternately laminated with a separator sheet interposed therebetween. Further, a plurality of electrode bodies 20 may be accommodated in the battery case 41.

Figure 3:
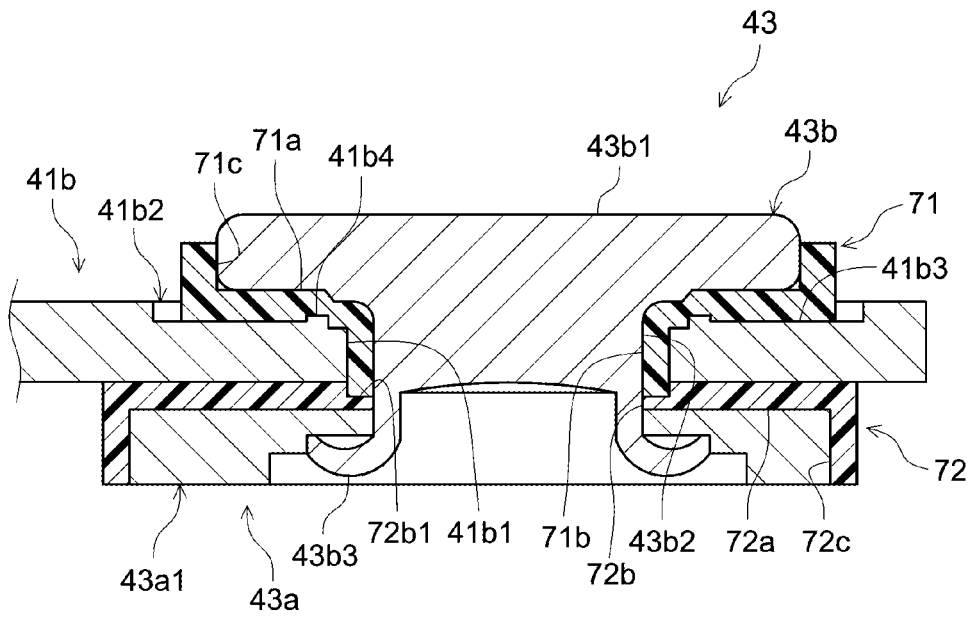
FIG. 3 is a sectional view taken along line III-III of FIG. 2.

FIG. 3 is a sectional view taken along line III-III of FIG. 2. FIG. 3 shows a cross section of a part where the negative electrode terminal 43 is attached to the lid 41b. In this embodiment, a member in which dissimilar metals are joined is used for the external terminal 43b of the negative electrode. In FIG. 3, the structure of dissimilar metals forming the external terminal 43b, the interface between dissimilar metals, and the like are not shown, and the cross-sectional shape of the external terminal 43b is schematically shown.

As shown in FIG. 3, the lid 41b has an attachment hole 41b1 for attaching the external terminal 43b of the negative electrode. The attachment hole 41b1 penetrates the lid 41b at a predetermined position of the lid 41b. The internal terminal 43a and the external terminal 43b of the negative electrode are attached to the attachment hole 41b1 of the lid 41b with the gasket 71 and the insulator 72 interposed therebetween. On the outside of the attachment hole 41b1, a step 41b2 on which the gasket 71 is mounted is provided around the attachment hole 41b1. The step 41b2 is provided with a seat surface 41b3 on which the gasket 71 is arranged. The seat surface 41b3 is provided with a projection 41b4 for positioning the gasket 71.

Here, as shown in FIG. 3, the external terminal 43b of the negative electrode includes a head 43b1, a shaft 43b2, and a caulking piece 43b3. The head 43b1 is a part arranged outside the lid 41b. The head 43b1 is a substantially flat part larger than the attachment hole 41b1. The shaft 43b2 is a part mounted in the attachment hole 41b1 with the gasket 71 interposed therebetween. The shaft 43b2 protrudes downward from a substantially central portion of the head 43b1. As shown in FIG. 3, the caulking piece 43b3 is a part caulked to the internal terminal 43a of the negative electrode inside the lid 41b. The caulking piece 43b3 extends from the shaft 43b2 and is bent and caulked to the internal terminal 43a of the negative electrode after being inserted into the lid 41b.

Gasket 71

As shown in FIG. 3, the gasket 71 is a member attached to the attachment hole 41b1 and the seat surface 41b3 of the lid 41b. In this embodiment, the gasket 71 includes a seat 71a, a boss 71b, and a side wall 71c. The seat 71a is a part mounted on the seat surface 41b3 provided on the outer surface around the attachment hole 41b1 of the lid 41b. The seat 71a has a substantially flat surface corresponding to the seat surface 41b3. The seat 71a is provided with a depression corresponding to the projection 41b4 of the seat surface 41b3. The boss 71b projects from the bottom surface of the seat 71a. The boss 71b has an outer shape along the inner side surface of the attachment hole 41b1 so as to be mounted on the attachment hole 41b1 of the lid 41b. The inner surface of the boss 71b serves as a mounting hole for mounting the shaft 43b2 of the external terminal 43b. The side wall 71c rises upward from the peripheral edge of the seat 71a. The head 43b1 of the external terminal 43b is mounted on a part surrounded by the side wall 71c of the gasket 71.

The gasket 71 is arranged between the lid 41b and the external terminal 43b to ensure insulation between the lid 41b and the external terminal 43b. Further, the gasket 71 ensures the airtightness of the attachment hole 41b1 of the lid 41b. From this point of view, it is preferable to use a material having excellent chemical resistance and weather resistance. In this embodiment, PFA is used for the gasket 71. PFA is a copolymer of tetrafluoroethylene and perfluoroalkoxyethylene (Tetrafluoroethylene Perfluoroalkylvinylether Copolymer). The material used for the gasket 71 is not limited to PFA.

Insulator 72

The insulator 72 is a member mounted inside the lid 41b around the attachment hole 41b1 of the lid 41b. The insulator 72 includes a base 72a, a hole 72b, and a side wall 72c. The base 72a is a part arranged along the inner surface of the lid 41b. In this embodiment, the base 72a is a substantially flat plate-shaped part. The base 72a is arranged along the inner side surface of the lid 41b, and has a size such that the base does not protrude from the lid 41b so that it can be housed in the case body 41a. The hole 72b is provided correspondingly to the attachment hole 41b1. In this embodiment, the hole 72b is provided in a substantially central portion of the base 72a. On the side surface of the lid 41b facing the inner side surface, a recessed step 72b1 is provided around the hole 72b. The step 72b1 accommodates the distal end of the boss 71b of the gasket 71 mounted in the attachment hole 41b1. The side wall 72c rises downward from the peripheral edge of the base 72a. A proximal portion 43a1 provided at one end of the internal terminal 43a of the negative electrode is accommodated in the base 72a. Since the insulator 72 is arranged inside the battery case 41, it is preferable that the insulator 72 have a required chemical resistance. In this embodiment, PPS is used for the insulator 72. PPS is a polyphenylene sulfide resin. The material used for the insulator 72 is not limited to PPS.

The internal terminal 43a of the negative electrode includes the proximal portion 43a1 and a connection piece 43a2 (see FIGS. 1 and 2). The proximal portion 43a1 is a part mounted on the base 72a of the insulator 72. In this embodiment, the proximal portion 43a1 has a shape corresponding to the inside of the side wall 72c around the base 72a of the insulator 72. As shown in FIGS. 1 and 2, the connection piece 43a2 extends from one end of the proximal portion 43a1 and extends into the case body 41a to be connected to the non-formation portion 22a1 of the negative electrode of the electrode body 20.

In this embodiment, the gasket 71 is attached to the outside of the lid 41b while the boss 71b is being mounted on the attachment hole 41b1. The external terminal 43b is mounted on the gasket 71. At this time, the shaft 43b2 of the external terminal 43b is inserted into the boss 71b of the gasket 71, and the head 43b1 of the external terminal 43b is arranged on the seat 71a of the gasket 71. The insulator 72 and the internal terminal 43a are attached to the inside of the lid 41b. As shown in FIG. 3, the caulking piece 43b3 of the external terminal 43b is bent and caulked to the proximal portion 43a1 of the internal terminal 43a. The caulking piece 43b3 of the external terminal 43b and the proximal portion 43a1 of the negative electrode terminal 43 may be partially metal-joined in order to improve conductivity.

For the internal terminal 42a of the positive electrode of the lithium ion secondary battery 10, the required level of oxidation-reduction resistance is not higher than that of the negative electrode. From the viewpoint of required oxidation-reduction resistance and weight reduction, aluminum can be used for the internal terminal 42a of the positive electrode. By contrast, for the internal terminal 43a of the negative electrode, the required level of oxidation-reduction resistance is higher than that of the positive electrode. From this point of view, copper may be used for the internal terminal 43a of the negative electrode. Meanwhile, as the bus bar to which the external terminal 43b is connected, aluminum or an aluminum alloy is used from the viewpoint of weight reduction and cost reduction.

The present inventor has studied the use of copper for a part of the external terminal 43b that is joined to the internal terminal 43a, and the use of aluminum or an aluminum alloy for a part of the external terminal 43b that is connected to the bus bar. In order to realize such a structure, in this embodiment, a member made of copper and aluminum is used as the external terminal 43b. Hereinafter, the structure of a terminal component 200 used as the external terminal 43b will be described.

Terminal Component 200

Figure 4:
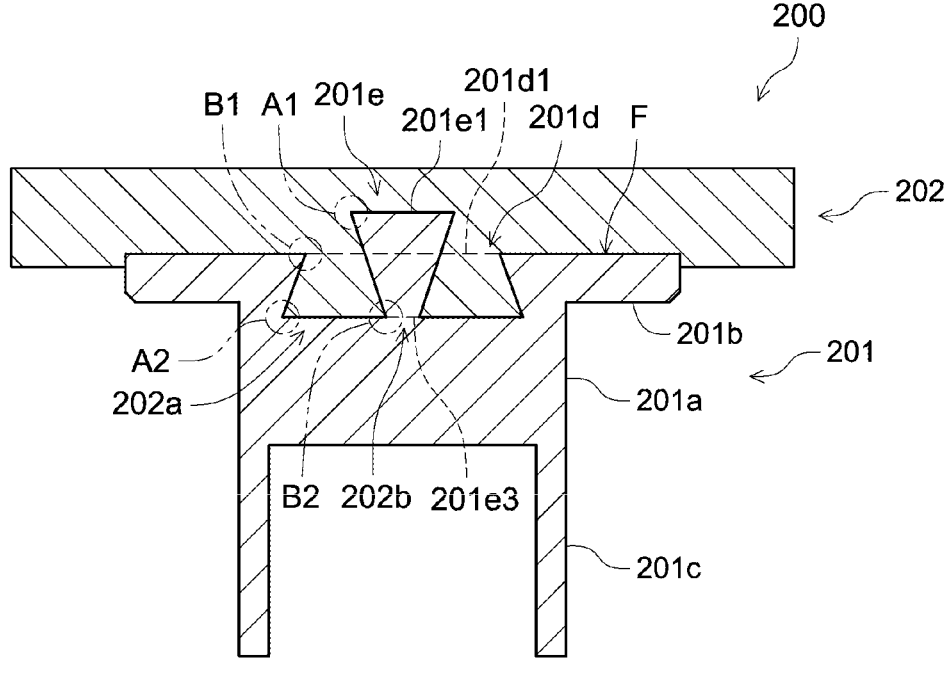
FIG. 4 is a cross-sectional view schematically showing a terminal component 200.
Figure 5:
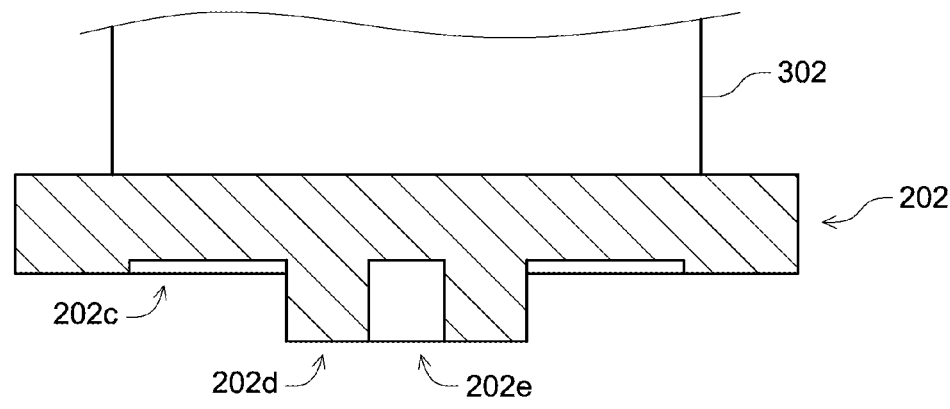
FIG. 5 is a cross-sectional view schematically showing a method for manufacturing the terminal component 200.
Figure 5:
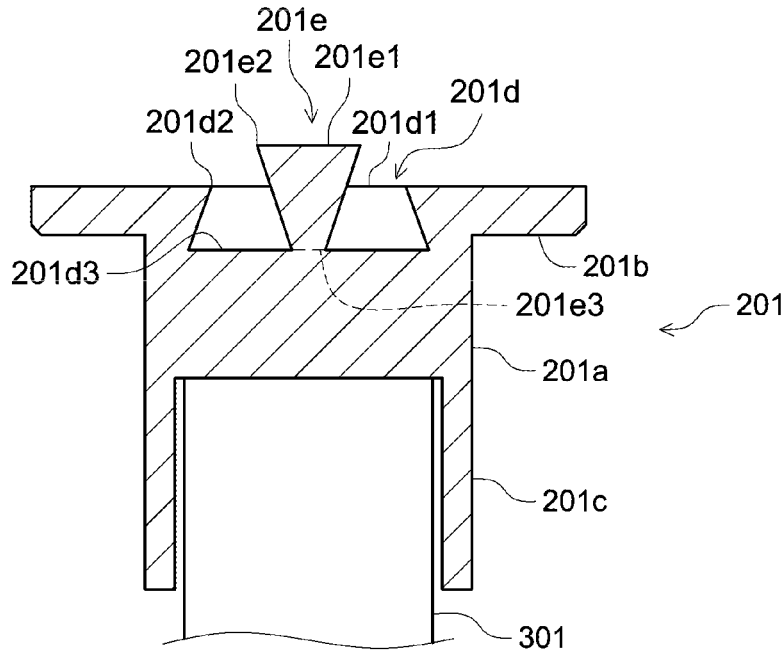

FIG. 4 is a cross-sectional view schematically showing the terminal component 200. FIG. 5 is a cross-sectional view schematically showing a method for manufacturing the terminal component 200 shown in FIG. 4. FIG. 4 schematically shows the structure of the first metal 201 and the second metal 202 constituting the terminal component 200, and how these metals are joined. FIG. 5 shows the first metal 201 and the second metal 202 before joining.

In this embodiment, the terminal component 200 may constitute the external terminal 43b to be attached to the battery case 41, for example, as shown in FIG. 3. As shown in FIG. 3, a part of the terminal component 200 as the external terminal 43b is connected to the internal terminal 43a inside the battery case 41, and a part is exposed to the outside of the battery case 41. As shown in FIG. 4, the terminal component 200 includes the first metal 201 and the second metal 202. The first metal 201 has a part to be connected to the internal terminal 43a. The second metal 202 has a part to be exposed to the outside of the battery case 41.

In this embodiment, the first metal 201 has a shaft 201a and a flange 201b, as shown in FIG. 4. The shaft 201a is a part serving as the shaft 43b2 (see FIG. 3) to be inserted into the attachment hole 41b1 of the lid 41b. The flange 201b is a part provided at one end of the shaft 201a and is wider than the shaft 201a. The shaft 201a is provided with a part 201c that serves as the caulking piece 43b3 (see FIG. 3) that is to be further caulked to the internal terminal 43a on the side opposite to the side on which the flange 201b is provided. The second metal 202 is overlapped on the end surface of the first metal 201 where the flange 201b is provided.

In this embodiment, the first metal 201 is configured of copper. As shown in FIG. 5, the first metal 201 is provided with a recess 201d and a protrusion 201e on the surface on the side on which the second metal 202 is to be overlapped. That is, the first metal 201 includes the recess 201d and the protrusion 201e on the end surface on the side where the flange 201b is provided.

In the recess 201d, an edge 201d2 of an opening 201d1 projects inward with respect to a bottom portion 201d3. In this embodiment, the recess 201d is a depression in which the bottom portion 201d3 has a flat, substantially truncated cone space. The inner diameter of the recess 201d increases from the opening 201d1 toward the bottom portion 201d3. The vertical cross section of the edge 201d2 of the opening 201d1 of the recess 201d has a wedge shape having an angle smaller than 90 degrees. The edge 201d2 of the recess 201d is continuous in the circumferential direction of the recess 201d. In the present description, a "vertical cross section" means a cross section perpendicular to the interface where the first metal 201 and the second metal 202 are overlapped.

In the protrusion 201e, an edge 201e2 of a top portion 201e1 projects outward with respect to a proximal end 201e3. In this embodiment, the protrusion 201e is provided so as to protrude upward from the center of the bottom portion 201d3 of the recess 201d. The outer diameter of the protrusion 201e gradually increases from the proximal end 201e3 provided on the bottom portion 201d3 of the recess 201d toward the top portion 201e1. In other words, the protrusion 201e has a substantially inverted truncated cone shape spreading in the radial direction from the proximal end 201e3 toward the top portion 201e1. The edge 201e2 of the top portion 201e1 of the protrusion 201e projects outward with respect to the proximal end 201e3. The vertical cross section of the edge 201e2 of the protrusion 201e has a wedge shape having an angle smaller than 90 degrees. The edge 201e2 of the protrusion 201e is continuous in the circumferential direction of the protrusion 201e. In this embodiment, the top portion 201e1 of the protrusion 201e is higher than the opening 201d1 of the recess 201d.

The second metal 202 is overlapped on the end surface of the first metal 201 provided with the recess 201d and the protrusion 201e, and is joined to the first metal 201. In this embodiment, the second metal 202 may be a metal having malleability and lower rigidity than the first metal 201. Specifically, in this embodiment, the first metal 201 is configured of copper, while the second metal 202 is configured of aluminum.

The second metal 202 is a substantially flat plate-shaped member, and is overlapped an end surface provided with the flange 201b of the first metal 201 provided with the recess 201d and the protrusion 201e. Where the second metal 202 is strongly pressed against the end surface of the first metal 201, as shown in FIG. 4, the second metal 202 is deformed into a shape along the recess 201d and the protrusion 201e of the end surface of the first metal 201. As a result, biting portions A1 and B1 where the edge of the first metal 201 bites into the second metal 202 and the biting portions A2 and B2 where the edge the second metal 202 bites into the first metal 201 are formed at the interface F where the first metal 201 and the second metal 202 are overlapped.

In the biting portion A1, the edge 201e2 of the top portion 201e1 of the protrusion 201e provided on the first metal 201 bites into the second metal 202.

In the biting portion B1, the edge 201d2 of the opening 201d1 of the recess 201d provided in the first metal 201 bites into the second metal 202.

In the biting portion A2, the second metal 202 enters the bottom of the substantially truncated cone recess 201d provided in the first metal 201. In other words, a part of the second metal 202 that has entered the substantially truncated cone recess 201d formed in the first metal 201 becomes a protrusion 202a in which the edge of the top portion projects outward with respect to the proximal end. The edge of the top portion of the protrusion 202a is in a state of biting into the first metal 201.

In the biting portion B2, the second metal 202 enters the proximal end of the substantially inverted truncated cone protrusion 201e provided on the first metal 201. In other words, a part of the second metal 202 that has entered the substantially inverted truncated cone protrusion 201e provided on the first metal 201 becomes a recess 202b in which the edge of the opening projects inward with respect to the bottom portion. The edge of the opening of the recess 202b is in a state of biting into the first metal 201.

The biting portions A1, A2, B1, and B2 have a shape that follows the shape of the other metal. In this embodiment, as shown in FIG. 4, the vertical cross section of the biting portions A1, A2, B1, and B2 that passes through the center of the interface F where the first metal 201 and the second metal 202 are overlapped has a wedge shape. In this embodiment, the angle of the wedges of the biting portions A1, A2, B1, and B2 is about 60 degrees. The angle of the wedge is set, as appropriate, according to the required joint strength and the like. Although not particularly limited, the angle of the wedge of the biting portion is usually 30 degrees or more, but may be 40 degrees or more, or 50 degrees or more. The angle of the wedge of the biting portion is usually less than 90 degrees, and may be 80 degrees or less, or 70 degrees or less.

Further, in this embodiment, the biting portion is continuously provided in the circumferential direction. The biting portion is not limited to this, and may be formed intermittently. It is preferable that the first metal 201 and the second metal 202 are in close contact with each other at the interface where the first metal 201 and the second metal 202 are overlapped, but a gap is allowed to be present.

In the terminal component 200, the biting portions A1, A2, B1, and B2 where the edge of one of the first metal 201 and the second metal 202 bites into the other metal are provided at four locations at the interface F where the first metal 201 and the second metal 202 are overlapped. With such terminal component 200, for example, even when a vibration of the lithium ion secondary battery 10 is transmitted to the terminal component 200, the load applied to the interface F between the first metal 201 and the second metal 202 is dispersed. Further, since the interface F between the first metal 201 and the second metal 202 meshes in a complicated manner, the durability is improved. From this point of view, the present inventor has found that at the interface F where the first metal 201 and the second metal 202 of one terminal component 200 are overlapped, the biting portion where the edge of one of the first metal 201 and the second metal 202 bites into the other metal is preferably provided in at least three locations in the vertical cross section along an arbitrary radial direction from the center of the interface F where the first metal 201 and the second metal 202 are overlapped.

From the above viewpoint, the biting portions A1, A2, B1, and B2 may have, for example, a wedge shape. Because of such shape, the biting portions A1, A2, B1, and B2 bite deeply into the other metal, so that the above-mentioned effect is likely to be advantageously exhibited.

An example of the method for manufacturing the terminal component 200 described above will be described hereinbelow. The method for manufacturing the terminal component 200 includes a step of preparing a first metal, a step of preparing a second metal, and a step of pressurizing the first metal and the second metal.

The first metal prepared in the step of preparing the first metal has at least one of a recess having a part where the edge of an opening projects inward with respect to a bottom portion, and a protrusion having a part where the edge of a top portion projects outward with respect to a proximal end.

In this embodiment, in the step of preparing the first metal, the first metal 201 having the above-mentioned shape is prepared.

In the embodiment shown in FIG. 5, the second metal 202 prepared in the step of preparing the second metal is a substantially flat member. The second metal 202 has a depression 202c corresponding to the end surface of the first metal 201 provided with the flange 201b. The bottom portion of the depression 202c is flat, and the center of the depression 202c is provided with a substantially cylindrical projection 202d corresponding to the recess 201d and the protrusion 201e of the first metal 201. The projection 202d extends vertically from the bottom portion. The projection 202d has a substantially cylindrical shape. A depression 202e is formed on the end surface of the projection 202d. The depression 202e is a substantially columnar space.

The projection 202d is a part that becomes the protrusion 202a corresponding to the recess 201d of the first metal 201. The depression 202e is a part that becomes the recess 202b corresponding to the protrusion 201e of the first metal 201 (see FIG. 4). The shape of the second metal 202 is not limited to this as long as the shape is plastically deformed along the shape of the first metal 201 in a subsequent step. The shape of the second metal 202 is selected, as appropriate, according to the shape of the first metal 201, the rigidity of the second metal, and the like. Such first metal 201 and second metal 202 can be manufactured by, for example, known metal processing such as forging or cutting.

In the pressurizing step, the first metal 201 and the second metal 202 are pressed against each other, and the second metal 202 is plastically deformed with respect to the first metal 201.

Here, a press machine (not shown) is used to press-fit the second metal 202 into the first metal 201. A press jig 301 is attached to the surface of the first metal 201 opposite to the side on which the flange 201b is provided. A press jig 302 is attached to the surface of the second metal 202 opposite to the surface on which the projection 202d is provided. The projection 202d and the depression 202e of the second metal 202 and the recess 201d and the protrusion 201e of the first metal 201 face each other. The press machine is operated to press the first metal 201 and the second metal 202 against each other. Here, the pressure applied by the press machine is set, as appropriate, according to the metal type and dimensions of the first metal 201 and the second metal 202. Although not limited to this, the press pressure can be set to, for example, about 200 N to 1600 N.

By pressing the first metal 201 and the second metal 202 against each other, the second metal 202 is plastically deformed along the surface where the recess 201d and the protrusion 201e are formed. The recess 201d and the protrusion 201e of the first metal 201 enter the second metal 202. In other words, the surface of the second metal 202 overlapped with the first metal 201 enters the recess 201d and the protrusion 201e of the first metal 201. As a result, the biting portions A1, A2, B1, and B2 are formed, and the terminal component 200 is manufactured.

In the embodiment shown in FIG. 5, the first metal 201 and the second metal 202 are pressed against each other to plastically deform the second metal 202 having low rigidity and to form the biting portions A1, A2, B1, and B2. However, the method of forming the biting portion is not limited to this. For example, one or both of the first metal and the second metal may be composed of a plurality of members. A biting portion may be formed by fitting one metal composed of a plurality of members to the other metal. At this time, the plurality of members may be assembled by fitting the members together, and then the respective members may be joined by welding, press-fitting, or the like. A caulking piece may be provided on one of the metals, and the caulking piece may be bent to form a biting portion. By hitting a part of one of the metals, the metal having low rigidity among the first metal and the second metal may be plastically deformed to form a biting portion. A biting portion may be also formed by combining these methods.

Figure 6:
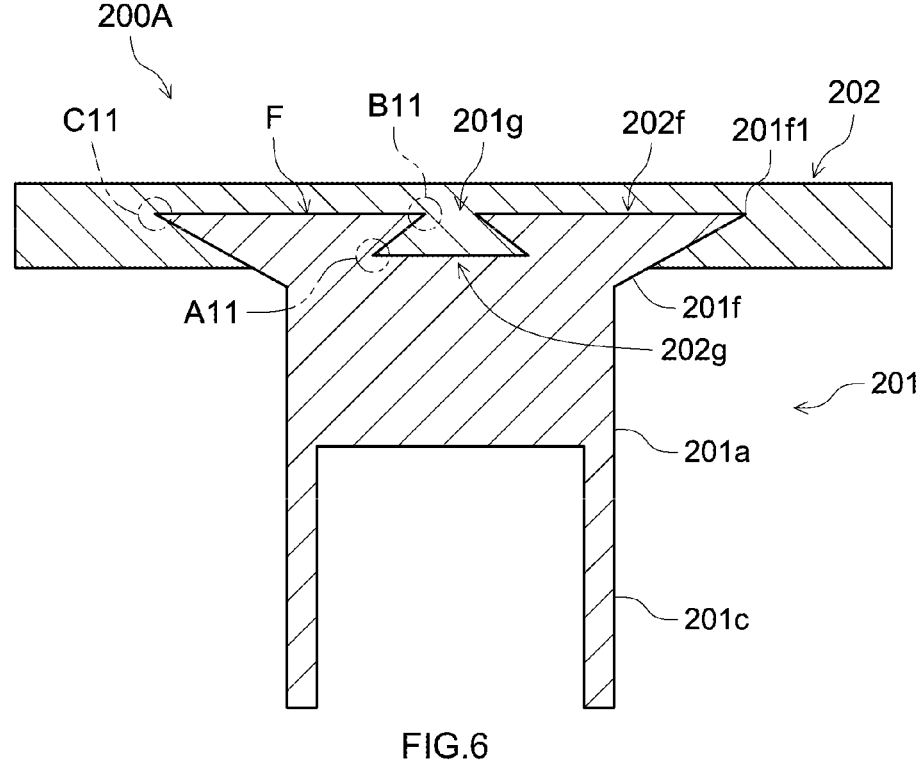
FIG. 6 is a cross-sectional view schematically showing a terminal component 200A.
Figure 7:
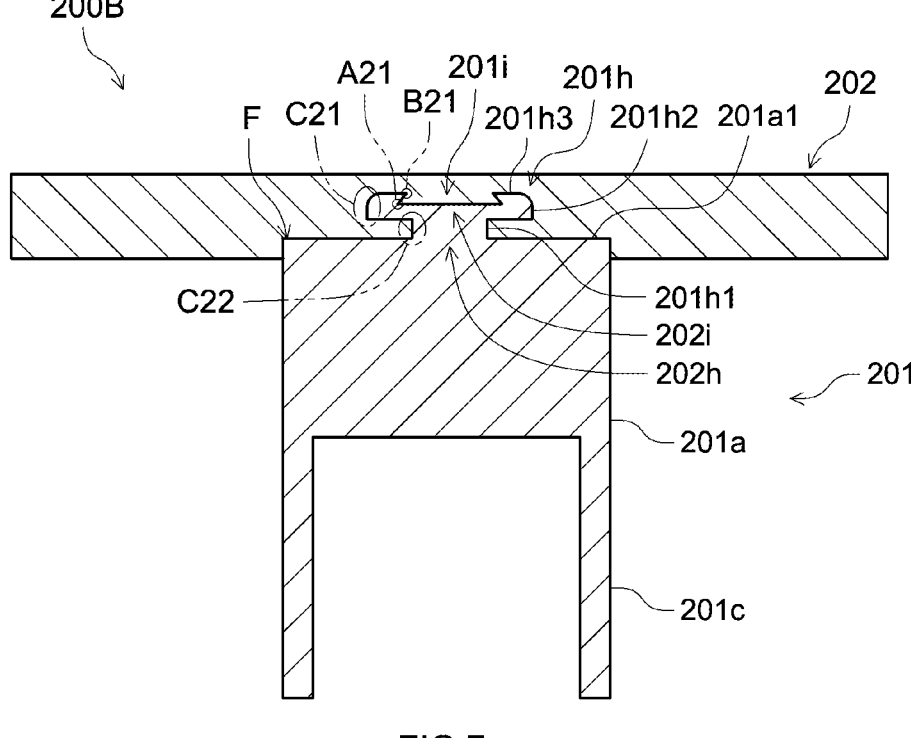
FIG. 7 is a cross-sectional view schematically showing a terminal component 200B.

FIGS. 6 and 7 show terminal components, which are other forms of the terminal component 200.

FIG. 6 is a cross-sectional view schematically showing a terminal component 200A. In the embodiment shown in FIG. 6, one end of the shaft 201*a* of the first metal 201 is provided with an inclined portion 201*f* that expands toward the end portion. The inclined portion 201*f* is continuous in the circumferential direction of the shaft 201*a*. The first metal 201 has a recess 201*g* on the end surface including the inclined portion 201*f*. The recess 201*g* is a space having a substantially truncated cone shape. The edge of the opening of the recess 201*g* projects inward with respect to the bottom portion.

The second metal 202 is overlapped with the end surface of the first metal 201 provided with the inclined portion 201*f*. The second metal 202 is provided with a depression 202*f* in which a part of the inclined portion 201*f* is accommodated. The second metal 202 is further provided with a protrusion 202*g* that follows the shape of the recess 201*g*.

Biting portions B11 and C11 where the edge of the first metal 201 bites into the second metal 202, and a biting portion A11 where the edge of the second metal 202 bites into the first metal 201 are provided at the interface F where the first metal 201 and the second metal 202 are overlapped.

In the biting portion A11, the edge of the top portion of the protrusion 202*g* provided on the second metal 202 bites into the first metal 201.

In the biting portion B11, the edge of the opening of the recess 201*g* provided in the first metal 201 bites into the second metal 202.

In the biting portion C11, an edge 201*f*1 of the inclined portion 201*f* provided on the first metal 201 bites into the second metal 202.

As described above, in the embodiment shown in FIG. 6, the biting portions A11, B11, and C11 are provided at three locations.

FIG. 7 is a cross-sectional view schematically showing the terminal component 200B.

In this embodiment, the first metal 201 is provided with a projection 201*h* on an end surface 201*a*1 at one end of the shaft 201*a*. The projection 201*h* has a circular cross section parallel to the end surface 201*a*1. The projection 201*h* has a cylindrical portion 201*h*l extending from a part of the end surface 201*a*1 of the shaft 201*a*, and a head 201*h*2 extending from the end portion of the cylindrical portion 201*h*1. The projection 201*h* is formed with a gently curved edge toward the outside at a top portion 201*h*3 of the head 201*h*2. The edge of the projection 201*h* projects outward with respect to the proximal end of the projection. The first metal 201 further has a recess 201*i* at the top portion 201*h*3 of the head 201*h*2. The edge of the opening of the recess 201*i* projects inward with respect to the bottom portion.

The second metal 202 is overlapped with the end surface of the first metal 201 provided with the projection 201*h*. As shown in FIG. 7, the second metal 202 is provided with a depression 202*h* in which the projection 201*h* is accommodated and which follows the shape of the projection 201*h*. The edge of the opening of the depression 202*h* is bent at a right angle toward the bottom portion. The edge of the opening of the depression 202*h* projects inward with respect to the bottom portion.

Biting portions B21 and C21 where the edge of the first metal 201 bites into the second metal 202, and biting portions A21 and C22 where the edge of the second metal 202 bites into the first metal 201 are provided at the interface F where the first metal 201 and the second metal 202 are overlapped.

In the biting portion A21, the edge of the top portion of the protrusion 202*i* provided on the second metal 202 bites into the first metal 201.

In the biting portion B21, the edge of the opening of the recess 201*i* provided in the first metal 201 bites into second metal 202.

In the biting portion C21, the edge of the projection 201*h* provided on the first metal 201 bites into the second metal 202.

In the biting portion C22, the edge of the opening of depression 202*h* provided in the second metal 202 bites into the first metal 201.

As described above, in the embodiment shown in FIG. 7, the biting portions A21, B21, C21, and C22 are provided at four locations.

The terminal component and secondary battery disclosed herein have been described in various ways. Unless otherwise specified, the terminal components and the embodiments of the secondary battery mentioned herein do not limit the present disclosure. Further, the secondary battery disclosed herein can be variously modified, and constituent elements thereof and processing referred to herein can be omitted, as appropriate, or combined, as appropriate, unless a specific problem occurs.

What is claimed is:

1. A battery terminal component comprising:

a first metal and a second metal overlapped on the first metal, wherein the first metal and second metal are dissimilar metals, and wherein biting portions continuously provided in a circumferential direction are provided in at least three separate locations in a vertical cross section along a radial direction from a center of an interface where the first metal and the second metal are overlapped, in each of the biting portions an edge of one of the first metal and the second metal bites into the other of the first metal and the second metal, each of the biting portions is formed between the other of the first metal and the second metal on the interface where the first metal and the second metal overlap, with each of the biting portions having a wedge shape wherein an angle of the wedge shape of each biting portion is an acute angle less than 90 degrees, in at least one of the biting portions, one of the first metal and the second metal has a recess in which an edge of an opening of the recess projects inward with respect to a bottom portion of the recess such that an inner diameter of the recess increases from the opening of the recess toward the bottom portion of the recess, and the edge of the opening of the recess bites into the other of the first metal and the second metal, and in at least one of the biting portions, one of the first metal and the second metal has a protrusion in which an edge of a top portion of the protrusion protrudes outward with respect to a proximal end of the protrusion such that an outer diameter of the protrusion increases from the proximal end of the protrusion toward the top portion of the protrusion, and the edge of the top portion of the protrusion bites into the other of the first metal and the second metal.

2. The battery terminal component according to claim 1, wherein the first metal is higher in rigidity than the second metal.

3. A secondary battery comprising: a battery case and an electrode terminal attached to the battery case, wherein the electrode terminal includes the battery terminal component according to claim 1.

4. A method for manufacturing the battery terminal component of claim 1, comprising:

a step of preparing a first metal;

a step of preparing a second metal;

and a step of pressurizing the first metal and the second metal, wherein the first metal is higher in rigidity than the second metal and is provided with at least one of a recess having a part in which an edge of an opening projects inward with respect to a bottom portion, and a protrusion having a part in which an edge of a top portion projects outward with respect to a proximal end, and in the pressurizing step, the first metal and the second metal are pressed against each other, and the second metal is plastically deformed with respect to the first metal, thereby forming at least three biting portions where an edge of one metal of the first metal and the second metal bites into the other metal at an interface where the first metal and the second metal are overlapped.

\* \* \* \* \*